United States Patent
Reddy et al.

(10) Patent No.: US 7,983,021 B2
(45) Date of Patent: Jul. 19, 2011

(54) OBLONG ELECTROCHEMICAL DOUBLE LAYER CAPACITOR

(75) Inventors: Kamjula Pattabhirami Reddy, Corning, NY (US); James Scott Sutherland, Corning, NY (US); Todd Marshall Wetherill, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 201 days.

(21) Appl. No.: 11/981,096

(22) Filed: Oct. 31, 2007

(65) Prior Publication Data

US 2009/0109600 A1   Apr. 30, 2009

(51) Int. Cl.
*H01G 9/00* (2006.01)
(52) U.S. Cl. ........................................ 361/502
(58) Field of Classification Search ............ 361/502
See application file for complete search history.

(56) References Cited

U.S. PATENT DOCUMENTS

| | | | |
|---|---|---|---|
| 2,928,888 A | 3/1960 | Vogt | |
| 3,206,661 A | 9/1965 | Blank | |
| 4,283,843 A * | 8/1981 | Hooke | 29/623.1 |
| 5,434,017 A * | 7/1995 | Berkowitz et al. | 429/94 |
| 5,450,279 A | 9/1995 | Yoshida et al. | |
| 5,956,226 A * | 9/1999 | Jung et al. | 361/514 |
| 6,623,884 B1 | 9/2003 | Spillman et al. | |
| 6,762,926 B1 | 7/2004 | Shiue et al. | |
| 6,828,059 B2 | 12/2004 | Miller et al. | |
| 7,014,948 B2 | 3/2006 | Lee et al. | |
| 7,035,078 B1 | 4/2006 | Viavattine | |
| 7,145,763 B2 | 12/2006 | Kim et al. | |
| 7,179,562 B2 * | 2/2007 | Zolotnik et al. | 429/211 |
| 2002/0061435 A1 * | 5/2002 | Hisai | 429/94 |
| 2004/0145344 A1 * | 7/2004 | Bushong et al. | 320/112 |
| 2005/0142436 A1 * | 6/2005 | Arai et al. | 429/94 |
| 2007/0009792 A1 * | 1/2007 | Cheon et al. | 429/161 |
| 2007/0053140 A1 | 3/2007 | Soliz | |
| 2009/0035657 A1 * | 2/2009 | Buiel et al. | 429/211 |

FOREIGN PATENT DOCUMENTS

| | | | |
|---|---|---|---|
| BE | 390 454 A | | 8/1932 |
| DE | 3006247 A | * | 8/1981 |
| FR | 2871615 A | | 12/2005 |
| JP | 58059561 A | * | 4/1983 |
| JP | 58214273 A | * | 12/1983 |
| JP | 09063908 A | * | 3/1997 |
| JP | 11219857 A | * | 8/1999 |
| JP | 2000277155 A | * | 10/2000 |
| JP | 2000315627 A | * | 11/2000 |
| JP | 2000348757 A | * | 12/2000 |
| JP | 2002175813 A | * | 6/2002 |
| JP | 2004178832 A | * | 6/2004 |

* cited by examiner

*Primary Examiner* — Eric Thomas
*Assistant Examiner* — David M Sinclair
(74) *Attorney, Agent, or Firm* — Michael W. Russell

(57) ABSTRACT

An oblong electrochemical double-layer capacitor is disclosed having a modified jelly roll design and having a plurality of fingers extending from each electrode in substantially the same direction. A packaged electrochemical double-layer capacitor is also disclosed comprising the oblong electrochemical double-layer capacitor having a modified jelly roll design. A method for manufacturing an oblong electrochemical double-layer capacitor having a modified jelly roll design is also disclosed.

10 Claims, 8 Drawing Sheets

OBLONG ELECTROCHEMICAL DOUBLE LAYER CAPACITOR

BACKGROUND OF THE INVENTION

1. Field of the Invention

The present invention relates to capacitors and specifically, to an electrochemical double layer capacitor.

2. Technical Background

Electrochemical Double Layer Capacitors (EDLCs), or ultracapacitors, have been the subject of considerable research in recent years. The emergence of alternative energy sources and the commercialization of hybrid electric vehicles (HEVs) have created a demand for efficient, high density energy storage devices. The development of such storage devices is necessary to enable implementation of battery or fuel cell technologies in high power demand applications.

Conventional EDLCs utilize a sandwich of two metallic electrodes separated by a porous dielectric material, such as paper. This sandwich can then be rolled up to form a cylinder, known as a "jelly-roll," with an electrolyte dispersed throughout the layers of the jelly roll. When a voltage is applied across terminals connected to each of the two electrodes, the electrolyte can ionize and an electric field on the surface of each electrode can accumulate a charge. The EDLC can store this charge until it is needed, at which time the EDLC can be discharged.

The maximum voltage that can be applied to the terminals of a given capacitor, such as an EDLC, and thus, the maximum charge that can be stored, is dependent upon the selection of components, such as the electrolyte, and the design of a given EDLC. For high power applications, such as, for example, HEVs, a large number of individual capacitors can be required. In these and other applications, the amount of space needed for a large number of capacitors can be substantial. Thus, factors such as efficiency, energy density, thermal management, electrical interconnects, control circuitry, and cost can be important in capacitor design.

There is a need to address the aforementioned problems and other shortcomings associated with conventional capacitors and energy storage devices. These needs and other needs are satisfied by the devices and articles of the present invention.

SUMMARY OF THE INVENTION

The present invention relates to capacitors and specifically, to electrochemical double layer capacitors that can provide efficient, high density energy storage, and to the use of such capacitors in demanding applications.

In a first aspect, the present invention provides a first electrode having a first longitudinal axis, a first body having a thickness, and a plurality of first fingers extending therefrom the first body in a first direction, which is substantially parallel to the longitudinal axis; a second electrode having a second longitudinal axis, which is substantially parallel to the first longitudinal axis, a second body having a thickness, and a plurality of second fingers extending therefrom the second body in the first direction; and an electrolyte distributed between at least a portion of the first and second bodies; wherein the first and second bodies are positioned in an interlaminated fashion and are separated by at least one non-conductive layer such that the first and second bodies are not in direct contact, wherein the interlaminated first and second bodies are substantially coiled about the longitudinal axis, wherein at least a portion of the first or second fingers have a thickness greater than at least one of the first or second body thickness; and wherein the plurality of first fingers form a first tabbed portion that defines a first predetermined three-dimensional pattern, and the plurality of second fingers form a second tabbed portion that defines a second predetermined three dimensional pattern, which is spaced therefrom the first tabbed portion.

In a second aspect, the present invention provides an electrochemical double-layer capacitor as described above, further comprising a container having a longitudinal axis and having a container cross section substantially similar to a capacitor cross-section, and wherein the container encloses the interlaminated first and second bodies.

In a third aspect, the present invention provides a device comprising a plurality of electrochemical double-layer capacitors configured in an at least two dimensional array, wherein each of the plurality of electrochemical double-layer capacitors has an oblong footprint, wherein each of the plurality of electrochemical double-layer capacitors comprise a sealed operating environment, and wherein the at least two dimensional array defines a plurality of conduits between the plurality of electrochemical double-layer capacitors.

In a fourth aspect, the present invention provides a method for manufacturing an electrochemical double-layer capacitor, the method comprising providing both a first electrode having a first longitudinal axis, a first body, and a plurality of first fingers extending therefrom the first body in a first direction, which is substantially parallel to the longitudinal axis; and providing a second electrode having a second longitudinal axis, which is substantially parallel to the first longitudinal axis, a second body, and a plurality of second fingers extending therefrom the second body in the first direction; and providing at least one non-conductive layer; and then positioning the first and second bodies in an interlaminated fashion separated by the at least one non-conductive layer, such that the first and second bodies are not in direct electrical contact, and then coiling the first and second bodies about the longitudinal axis such that the plurality of first fingers form a first tabbed portion and the plurality of second fingers form a second tabbed portion, which is spaced therefrom the first tabbed portion.

Additional aspects and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the present invention and together with the description, serve to explain, without limitation, the principles of the invention. Like numbers represent the same elements throughout, the figures.

DETAILED DESCRIPTION OF THE INVENTION

Figure 1:
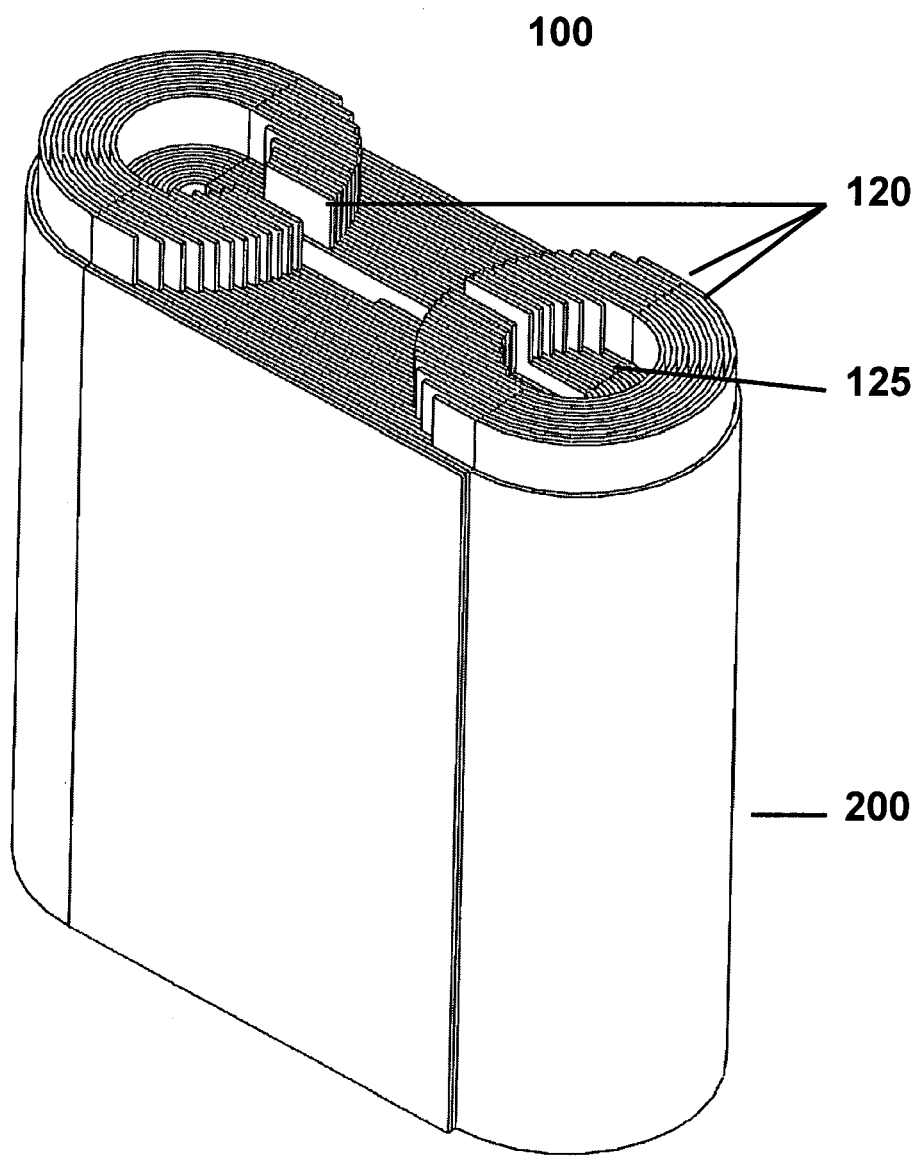
FIG. 1 is a schematic illustration of an oblong modified jelly-roll capacitor cell having extended electrode tabs at opposite ends of the oblong cell, in accordance with various aspects of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known embodiments. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optionally substituted component" means that the component can or can not be substituted and that the description includes both unsubstituted and substituted aspects of the invention.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As briefly introduced above and with reference to the figures, the present invention provides an oblong electrochemical double layer capacitor cell having a modified jelly-roll design, wherein each of two electrodes has multiple tabs extending beyond the charge accumulating portion of the electrode, and wherein the multiple tabs of each electrode can be connected and attached to an electrical terminal. The present invention also provides a packaged electrochemical double-layer capacitor, a space efficient capacitor device comprising a plurality of individual oblong electrochemical double layer capacitor cells and providing improved thermal management capabilities, methods for manufacturing the oblong electrochemical double-layer capacitors, packaged electrochemical double-layer capacitors, and devices of the present invention.

Conventional Jelly-Roll Design

Conventional jelly-roll capacitor designs utilize two electrodes and two separators stacked in an alternating manner and rolled along an axis into a "jelly-roll" cylinder. In such a conventional design, each of the two electrodes, prior to rolling, are positioned such that a portion of the electrode extends beyond the separators and the other electrode in a direction normal to the axis. Thus, each of the two electrodes extend beyond the unrolled stack in an opposing direction. When the electrodes and separators are rolled, the extended electrode portions provide a means to connect the capacitor to an electrical circuit via opposing ends of the cylinder. In some conventional designs, the extended portions of each electrode can be smeared together to provide an electrical terminal. The extended portions can also be welded or brazed to leads or terminal hardware position on, for example, an end cap. An alternative conventional design can utilize bundles of electrodes, wherein each electrode has an extended tab that can be attached to a hardware terminal. The designs of these conventional capacitors, while functional, are not spatially efficient. Further, the design of these conventional capacitors does not facilitate low cost construction or provide for low electrical loss as is required for high power density demand applications.

Oblong Modified Jelly-Roll Design

The present invention provides an electrochemical double layer capacitor cell having a modified jelly-roll design that can provide, for example, high energy density, efficient packing, and improved thermal management over conventional designs.

The size and shape of an electrode of the present invention can be any such size and/or shape suitable for an electrochemical double-layer capacitor. In one aspect, an electrode can comprise a strip of conductive material, such as, for example, a flexible aluminum foil, that can be folded, rolled, and/or coiled. Each of the electrodes can comprise a body portion that, when assembled as a capacitor, can accumulate charge on at least a portion of the surface thereof. Each of the electrodes can also comprise a plurality of fingers that extend from one edge of the electrode. In one aspect, the fingers extend in a direction normal to longitudinal axis upon which the electrode will be coiled. In another aspect, the fingers of both electrodes extend in the same direction. The number, position, size, and shape of any one or more fingers on an electrode can vary and the present invention is not intended to be limited to any particular pattern or number of fingers. In various aspects, an electrode can comprise, for example, 2, 3, 4, 5, 10, 20, or more fingers extending from one edge.

An electrode having a desired pattern of fingers can be, for example, die cut from a sheet of the electrode material. In one aspect, the pattern of fingers on an electrode is designed to provide a predetermined three-dimensional pattern after the electrodes are coiled. In another aspect, the size and shape of any two or more fingers on an electrode can be designed to facilitate connection to an electrical connection, such as a hardware terminal. In another aspect, the pattern of fingers on an electrode can be designed to provide, after coiling the electrodes, a tabbed portion, wherein multiple fingers are positioned in close proximity to another. The patterns necessary to create a desired shape and/or three-dimensional pattern of tabbed portions can vary depending upon such factors as capacitor size, the thickness of the components used in fabrication of a capacitor, and the geometry of the desire three-dimensional pattern. The capacitor and methods of the present invention can facilitate conventional, cost effective techniques, such as, for example die cutting, to rapidly manufacture electrodes having a specific predetermined pattern.

Figure 2:
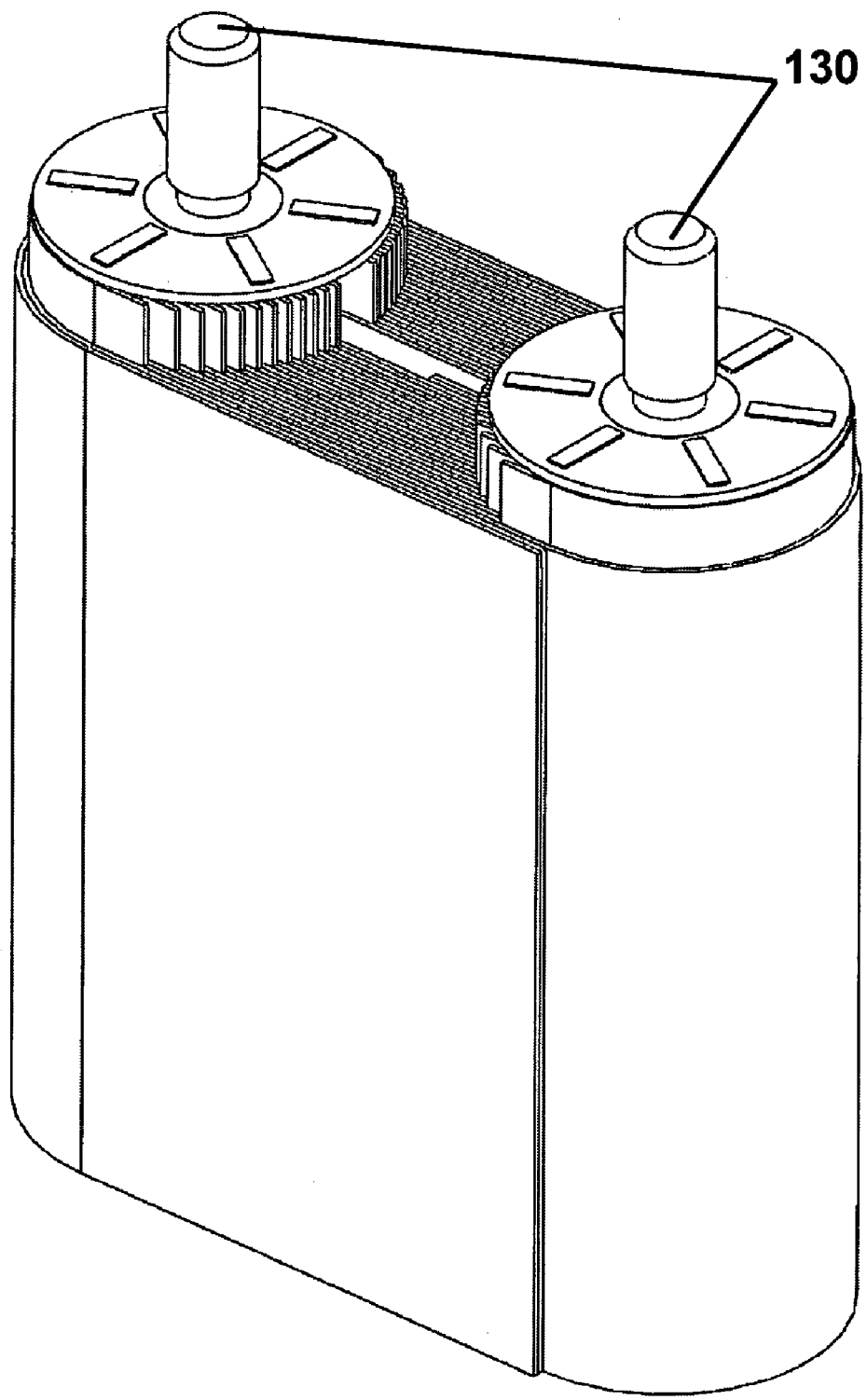
FIG. 2 is a schematic illustration of an oblong modified jelly-roll capacitor cell having terminals affixed to each bundle of extended tabs, in accordance with various aspects of the present invention.

With reference to the figures, a predetermined three-dimensional pattern formed by the tabbed portions 120 of an oblong capacitor 100 can, in a specific aspect, form a cavity 125, as illustrated in FIG. 1, into which a hardware terminal or a portion thereof can be inserted and/or attached. FIG. 2 illustrates an exemplary aspect of the present invention wherein hardware terminals 130 are inserted into the cavity formed by a tabbed portion. In one aspect, two or more of the extended fingers from a tabbed portion of a coiled electrode can be contacted and/or forced into electrical contact with each other. Such contact can comprise physical contact and or other techniques, such as, for example, welding. In a further aspect, a separate hardware terminal can be at least partially inserted into each of the first and second tabbed portions to provide electrical connection to each of the two electrodes of the capacitor. Such a design can enable pre-positioning and attachment of a terminal to one of the tabbed portions. In various aspects, any combination of one or more of the fingers comprising a tabbed portion can be attached together and/or to a hardware terminal or lead. The method of attachment for fingers of a tabbed portion and/or a hardware terminal can be any suitable technique such as, for example, welding, laser welding, brazing/soldering, or a combination thereof. FIG. 2 illustrates such an exemplary aspect of an oblong modified jelly roll capacitor, wherein the fingers of each tabbed portion have been welded together and to a hardware terminal. A hardware terminal can comprise any suitable material and can be, for example, a combination of a screw component and a disk. In a specific aspect, a hardware terminal is comprised of an aluminum alloy screw that has been welded to a thin aluminum alloy disk. The exemplary techniques described herein for positioning and attaching a terminal to a tabbed portion can, in various aspects, be more spatially efficient that conventional techniques utilizing clamps or rivets. These techniques can also reduce the electrical resistance associated with such connections, thus allowing improved cell performance.

The number and pattern, for example, position, shape, and size, of fingers on an electrode can vary from the number and pattern of fingers on the other electrode. In one aspect, the number and pattern of fingers on each electrode are different and are designed to provide, when the electrodes are coiled, two separate regions, or tabbed portions, of fingers, wherein a first region comprises the fingers from one electrode and a second region comprises the fingers from the other electrode. Such a design can allow a plurality of connections between a given electrode and a hardware terminal on, for example, the same side of a capacitor.

Figure 3A:
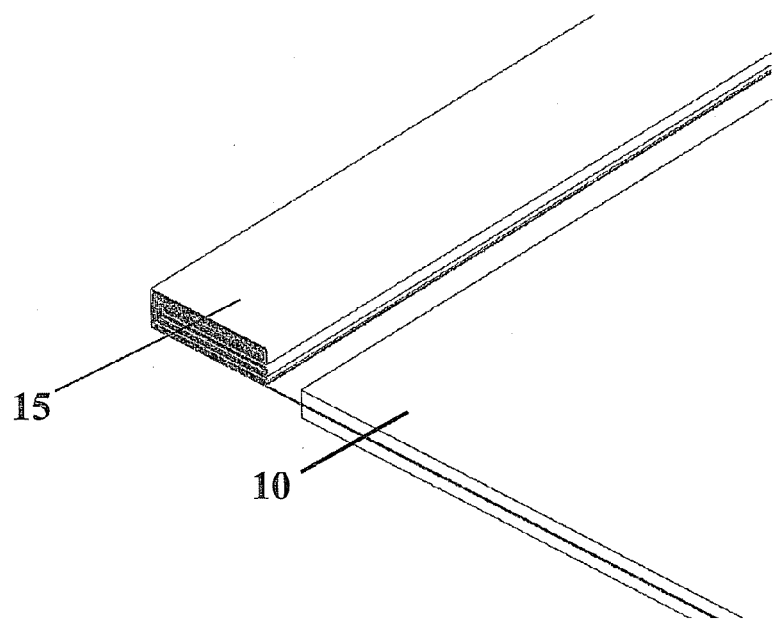
FIG. 3A illustrates multiple folds of an electrode foil, in accordance with various aspects of the present invention.

The thickness of an electrode material and the fingers thereon can be any thickness suitable for use in an electrochemical double layer capacitor. In one aspect, the thickness of an electrode should be sufficiently low as to provide a high surface area to volume ratio when used in a capacitor, yet still able to possess sufficient mechanical strength to prevent, for example, damage, perforation, and/or tearing of the electrode material. In one aspect, the thickness of an electrode material can be the same or substantially similar to the thickness of the one or more non-conductive separator materials described herein. In a specific aspect, the foil of an aluminum electrode can have a thickness of about 25 µm. In other aspects, either the body portion 10 and/or the finger portion 15 of an electrode can be folded one or more times, as illustrated in FIG. 3A, to increase the thickness of the material. If the finger portion of an electrode is folded, for example, from about 2 to about 3 times or more, the thickness of the folded finger portion can be about 100, 150, 200 µm or more. Such an increased thickness can allow for more effective joining of one or more finger portions to a hardware terminal. In a specific aspect, the finger portions of an electrode are neatly folded to increase the thickness thereof. A folded finger portion of an electrode can have a thickness greater than the thickness of the body portion of the electrode itself, not including any carbon coating that can be present on the surface thereof. In another aspect, a neatly folded finger portion of an electrode can have a thickness equal to or substantially equal to the combined thickness of the electrode body, carbon coating if present, non-conductive layer, and any spaces therebetween, such that when the interlaminated structure is coiled, each of the neatly folded finger portions are in direct or substantially direct contact with each other. Such a design can, in various aspects, increase the electrical contact area and increase the strength of the tabbed portion of an electrode. In other aspects, the finger portions of an electrode are not folded. In yet another aspect, the thickness of an electrode can vary across its surface. Each of the electrodes can comprise the same or varying thicknesses and the present invention is not intended to be limited to any particular thickness.

It should be recognized that manufacturing tolerances associated with, for example, the thickness of an electrode layer and cutting and/or forming finger portions of an electrode can vary and can affect the specific position and alignment of one or more fingered portions. The specific design of an electrode and/or pattern of finger portions can be adjusted based on factors, such as, for example, material properties and process tolerance factors to provide improved process control and thus, positioning and alignment of fingered portions.

The electrodes of the present invention can comprise any conductive material suitable for use in an electrochemical double layer capacitor. In one aspect, at least one of the electrodes comprises a flexible conductive material that can be, for example, folded, rolled, or coiled. In another aspect, at least one of the electrodes comprises a metal, such as, for example, aluminum. In another aspect, one or both of the electrodes comprise a carbon material, such as, for example, a carbon coating, that can increase the available surface of an electrode. It is not required that both electrodes have the same composition and both aspects where the electrodes have the same and different compositions are intended to be included in the invention. In another aspect, the electrodes comprise a material compatible with the other materials and electrolytes utilized in the capacitor design. In a specific aspect, the electrodes comprise a material that is substantially non-corrosive in the capacitor environment. In yet another aspect, at least one of the electrodes comprises a coating on at least one surface thereof, such as, for example, all or a portion of the body of the electrode. In a specific aspect, a carbon coating comprising, for example, a high surface area carbon, is present on at least a portion of one surface of at least one of the electrodes. In a further aspect, all of the active areas of an electrode surface comprise a high surface area carbon coating. Electrode and electrode coating materials are commercially available and one of skill in the art could readily select an appropriate electrode and/or electrode coating material.

Figure 3B:
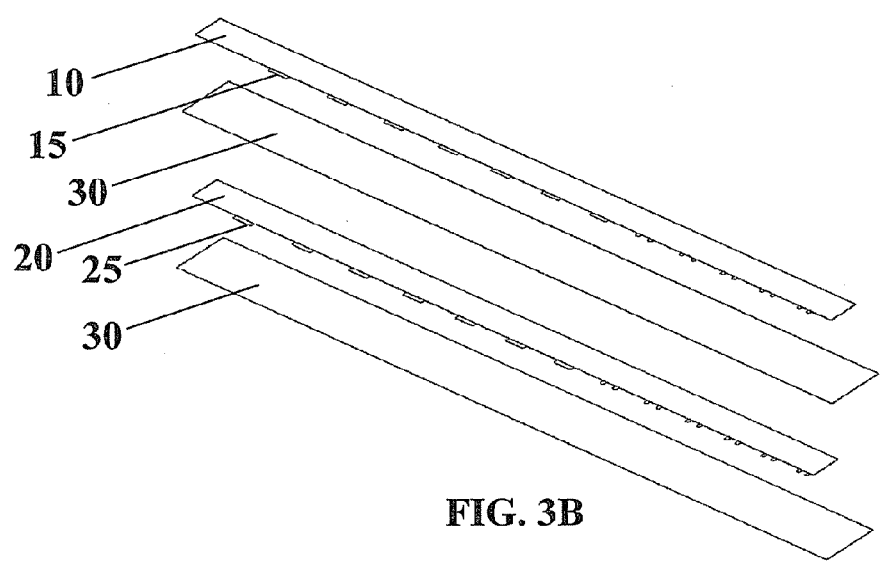
FIG. 3B is an exploded view of the electrodes and separator materials of a capacitor cell, wherein the electrodes have a plurality of tabs positioned along one edge of the electrode, in accordance with various aspects of the present invention.

As illustrated in FIG. 3B, the body portion 10, 20 of the electrodes of the electrochemical double-layer capacitor of the present invention can be positioned in an interlaminated fashion, separated by at least one non-conductive layer 30. In such an arrangement, at least a portion of the body of one electrode can be in registration with at least a portion of the body of the other electrode and the fingers 15, 25 of each electrode can also extend in substantially the same direction. The at least one non-conductive layer can be designed to prevent direct electrical contact between the two electrodes. The body portion of the electrodes can further comprise one or more additional non-conductive layers positioned, for example, on a surface of the first electrode opposite another non-conductive layer. The non-conductive can comprise any suitable geometry suitable for use in a capacitor. In a preferred aspect, the non-conductive layer covers the body portion of the at least one electrode adjacent thereto.

The non-conductive layer can comprise any suitable material for providing a dielectric layer in a capacitor. In various aspects, the at least one non-conductive layer comprises a paper, mica, glass, ceramic, aerogel, silica, non-conductive carbon, polymeric material, or a combination thereof. In one aspect, the non-conductive material is substantially non-conductive under the voltages and operating conditions of operation for a given capacitor. In another aspect, the non-conductive layer is porous. In a specific aspect, the non-conductive layer is sufficiently porous as to allow an electrolyte to permeate and/or diffuse through the non-conductive layer. The one or more non-conductive layers can comprise the same or different compositions and the present invention is not intended to be limited to a particular non-conductive material. Non-conductive layers and materials for the construction thereof are commercially available and one of skill in the art could readily select an appropriate non-conductive material.

The laminated structure comprising the first and second electrode bodies and the at least one non-conductive layer can be coiled around an axis such that the plurality of fingers from both electrodes extend in one direction. An exploded schematic illustrating a coiled structure 200 and the tabbed portions 120 formed by the electrode fingers is illustrated in FIG. 1. The manner in which the laminated structure is coiled can vary depending upon the desired shape of the capacitor. In one aspect, the laminated structure is coiled around a bar having a width greater than its thickness. In another aspect, the laminated structure is coiled around a mandrel. A mandrel, if used, can be either removed after the laminated structure is coiled or left in place to function as, for example, a heat sink in the capacitor during operation. Such a heat sink mandrel can optionally be connected to an external component such as, for example, a thermal transfer pad positioned at an opposite end of the capacitor from the tabbed portions.

In one aspect, the coiled structure is cylindrical, wherein a cross section of the capacitor is circular. In another aspect, the coiled structure can have a cross section that is non-circular. In another aspect, the coiled structure can have a cross section that is oblong or substantially oblong, as illustrated in FIGS. 1 and 2. In a preferred aspect, the coiled structure has an oblong cross section. As used herein, the term "oblong" is intended to refer to the following shapes and variations thereof: an oval, a shape comprised of two semi-circles connected by substantially parallel straight lines, a rectangular shape having rounded ends and/or corners. The specific shape, for example, of a coiled structure can vary and the present invention is not intended to be limited to any particular shape. For example, the shape of an end of an oblong structure can vary, including the radius of curvature and/or angle of an end. The oblong coiled structure of the present invention can provide a high internal packing efficiency, while allowing discrete tabbed portions for the connection of electrical terminals on a common surface of the capacitor. Further, the term "footprint", as used herein, is intended to refer to the shape of an end of a component or device, such as, for example, an electrochemical double-layer capacitor, that can be in contact with a solid surface, or a cross section of a component or device, such as, for example, a cross section of the interlaminated first and second bodies.

Packaged Electrochemical Double-Layer Capacitor

Figures 4A, 4B:
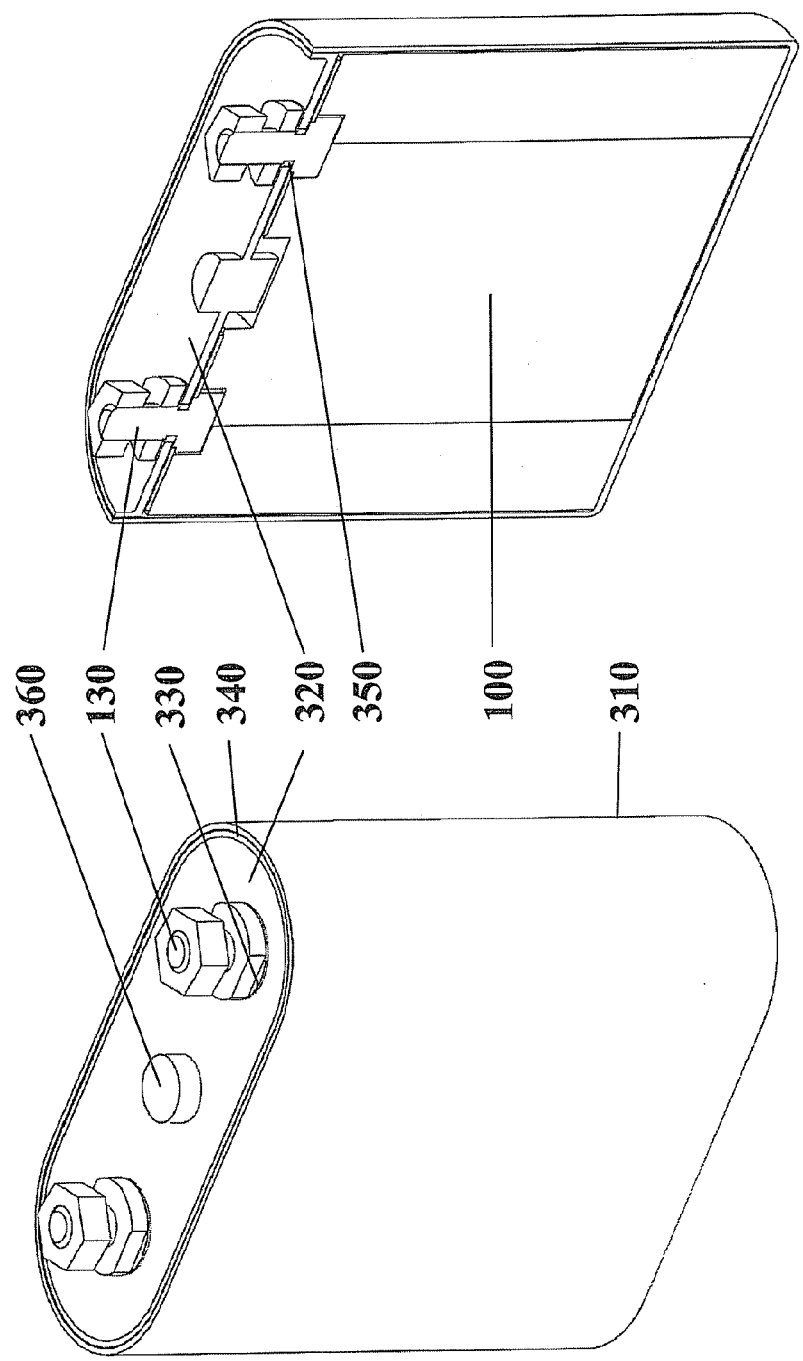
FIGS. 4A & 4B illustrate an oblong capacitor cell design, in accordance with various aspects of the present invention.

The electrochemical double-layer capacitor of the present invention can be packaged in a container 310 comprising, for example, the coiled capacitor 100, hardware terminals 130, and an electrolyte. As illustrated in FIGS. 4A and 4B, the container can comprise one or more electrical insulators 330 to prevent electrical shorting between the electrodes, tabbed portions, and the container. A seal 350 can optionally be used to provide a closed environment and prevent leakage of the electrolyte. The seal, if used, can comprise any suitable sealing technology such as, for example, a crimped metal seal, an o-ring seal, a weld seal such as from a laser welding and/or gas tungsten arc welding technique, an epoxy or polymeric seal, or a combination thereof. If screw terminals are attached to the tabbed portions of the coiled capacitor structure, nuts can be used to, for example, secure a terminal to an end cap 320, as depicted in FIG. 4A. An appropriate welding technique can be used to form an edge weld 340 to secure an end cap to the container, without creating excessive heat which could damage internal components.

A container for a packaged electrochemical double-layer capacitor can optionally comprise at least one port 360. In various aspects, a port can be used as a pressure relief device, a fill port for electrolyte, or a combination thereof. In a specific aspect, a port is positioned on the end cap comprising the hardware terminals such that the port provides access to the center of the coiled structure within the container. Such a port can be used to introduce electrolyte into the container, wherein the electrolyte can flow to the opposite end of the container and more uniformly fill and/or distribute throughout the coiled structure. The specific design of a port, if present, can be any design suitable for use in a packaged electrochemical double-layer capacitor, including, for example, a plug, a burst membrane or rupture disk, an o-ring seal, or a combination thereof. A port, if present, can thus provide a means to release excessive pressure in the container, such as can occur if a voltage in excess of the capacitor's tolerance (e.g., 2.7 V) is applied.

The size and shape of a container, if present, can vary depending on the intended application of the device, and the present invention is not intended to be limited to a particular size and/or shape. In one aspect, the container is substantially the same shape as the electrochemical double-layer capacitor. In another aspect, the container has a container cross section that is substantially similar to a cross section of the capacitor. In a specific aspect, the container has an oblong cross section. It is preferred that the container be substantially the same size and shape as the electrochemical double-layer capacitor to prevent consumption of unnecessary space in a device.

Multi-Capacitor Device

The present invention also provides a device comprising a plurality of electrochemical double-layer capacitors configured in an at least two dimensional array, wherein each of the plurality of electrochemical double-layer capacitors has an oblong footprint, wherein each of the plurality of electrochemical double-layer capacitors comprise a sealed operating environment, and wherein the at least two dimensional array defines a plurality of conduits between the plurality of electrochemical double-layer capacitors. A bank or array of capacitors can be useful in providing a high voltage output for applications such as HEVs. The various designs of a multi-capacitor device described herein can also provide improved performance in packaging efficiency and thermal management over conventional capacitor systems. The present invention provides, in various aspects, a device comprising a plurality of electrochemical double-layer capacitors, wherein each of the capacitors comprises one or more individual capacitor cells, and wherein each capacitor comprises a sealed operating environment. In one aspect, one or more of the plurality of capacitors are oblong in shape and formed from the modified jelly-roll construction described herein. In a specific aspect, all of the plurality of capacitors are oblong in shape and are formed from the modified jelly-roll construction described herein.

In one aspect, one or more of the electrochemical double-layer capacitors of the device can comprise the electrochemical double-layer capacitor described herein. In another aspect, one or more of the electrochemical double-layer capacitors of the device can comprise a different capacitor design and/or structure. In yet another aspect, the plurality of electrochemical double-layer capacitors in the device can vary in design, structure, and composition. In a preferred aspect, each of the electrochemical double-layer capacitors of the device, whether of the construction described herein, or of a varying construction, has an oblong footprint. The oblong footprint of such a capacitor can be due to a container in which a capacitor is placed. While the placement of a non-oblong shaped capacitor into an oblong shaped container reduces the volume efficiency of a device, the present invention is intended to cover such aspects in a non-limiting manner. In a preferred aspect, each of the electrochemical double-layer capacitors of the device has an oblong footprint and are positioned within oblong containers in a volume efficient manner.

The specific size and geometry of an array for the device can vary, depending upon the intended application. In one aspect, the device is a two dimensional array of capacitors comprising 2, 3, 4, 5, 10, 20, or more capacitors arranged in a single or multiple rows. In another aspect, the device is a three dimensional array of capacitors comprising multiple two dimensional arrays of the same or varying geometry positioned in a vertical arrangement. The present invention is not intended to be limited to any specific arrangement of any portion of the array. In a preferred aspect, the arrangement of an array, and thus, the configuration of any one or more capacitors within the array, is designed so as to maximize the energy per unit volume of the device.

When EDLCs are utilized in high power demand applications, such as HEVs, multiple capacitor cells are typically connected in series to boost the output voltage. In one aspect, multiple capacitor cells can be connected in series to boost an output voltage from about 2.7 V for an individual capacitor cell to about 500 V or more. While the maximum output voltage for an individual capacitor cell is limited by the components used therein (e.g., electrolyte), an array of capacitors can provide 200 V, 300 V, 400 V, 500 V, or more.

When multiple capacitor cells are electrically connected, care should be taken to ensure that the voltage applied to any individual capacitor cell does not exceed the tolerance of the cell. In one aspect, the present invention provides a balancing circuit to limit the voltage applied to any individual capacitor cell. In a specific aspect, a balancing circuit is provided that limits the voltage applied to any individual capacitor cell to about 2.7 V.

Packing Efficiency

Figure 5:
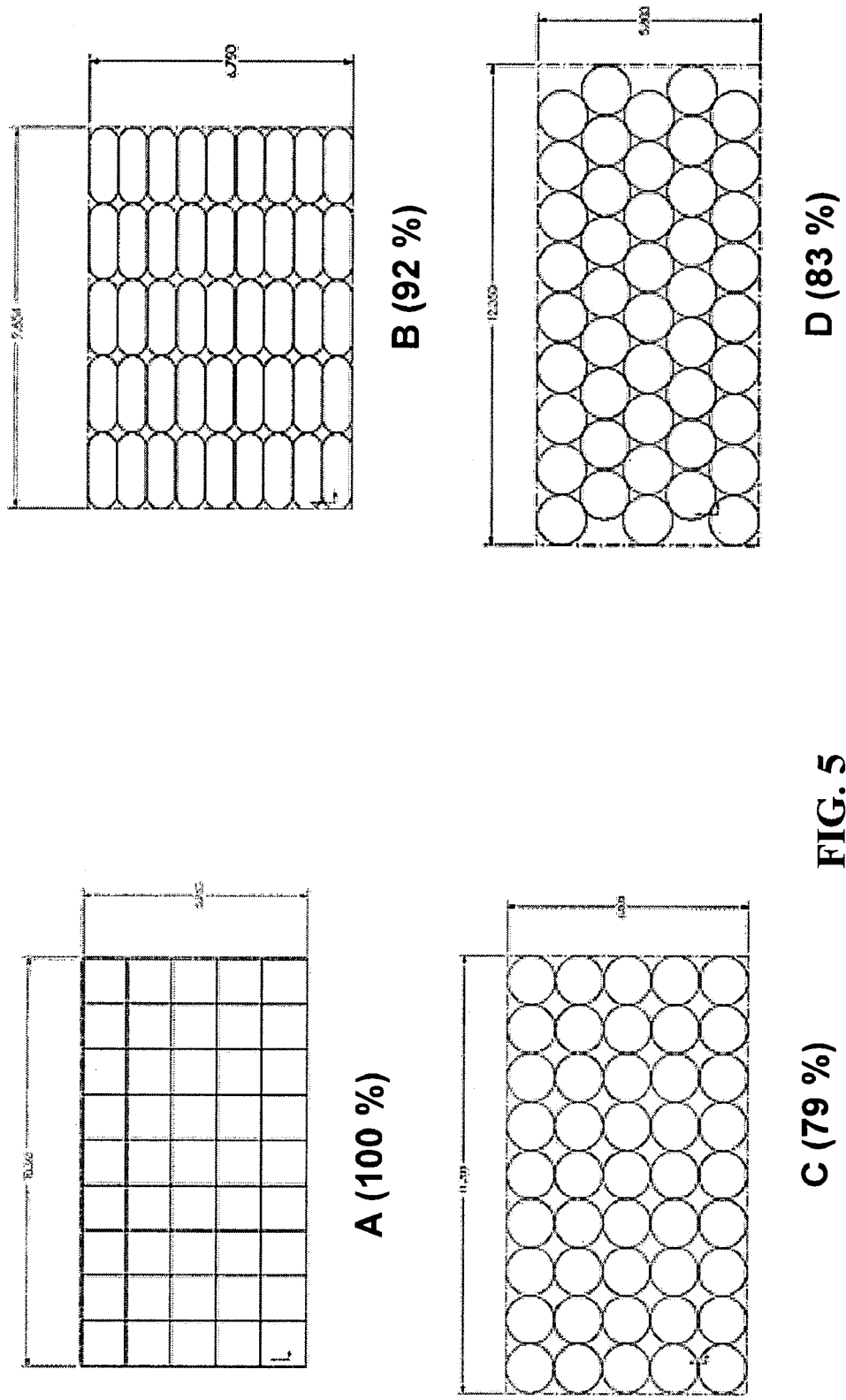
FIG. 5 illustrates the packing efficiency attainable with arrays of: A) rectangular, B) oblong, C) round, and D) staggered round cells, in accordance with various aspects of the present invention.

The packing efficiency of an individual capacitor cell and an array of capacitor cells can be important in applications such as HEVs. As illustrated in FIG. 5A, an ideal arrangement of rectangular cells can be packed with 100% efficiency. However, rectangular cells do not provide the low cost benefits of jelly-roll construction and the tight packing at the packaged capacitor level does not provide space between the individual capacitor cells to remove heat generated from the internally packed cells by, for example, air flow or other means. While a round capacitor cell design, as depicted in FIG. 5C, can provide space, such as conduits between the individual capacitor cells, in which air or other cooling fluid can be passed to remove heat generated within the capacitor cells, the packaging efficiency of such a design drops to 79% when compared to a solid packing of square or rectangular cells. If the round capacitor cells depicted in FIG. 5C are staggered, as depicted in FIG. 5D, the packing efficiency can be boosted to 83%.

In contrast, the oblong capacitor cell design of the present invention can provide a packing efficiency of about 92%, as depicted in FIG. 5B. The rounded edges of an oblong capacitor cell can provide space, in the form of conduits 410 between the individual capacitor cells, for air flow through a stack of multiple individual capacitor cells in a manner similar to a round package, while providing significantly improved packing efficiency.

Figure 6:
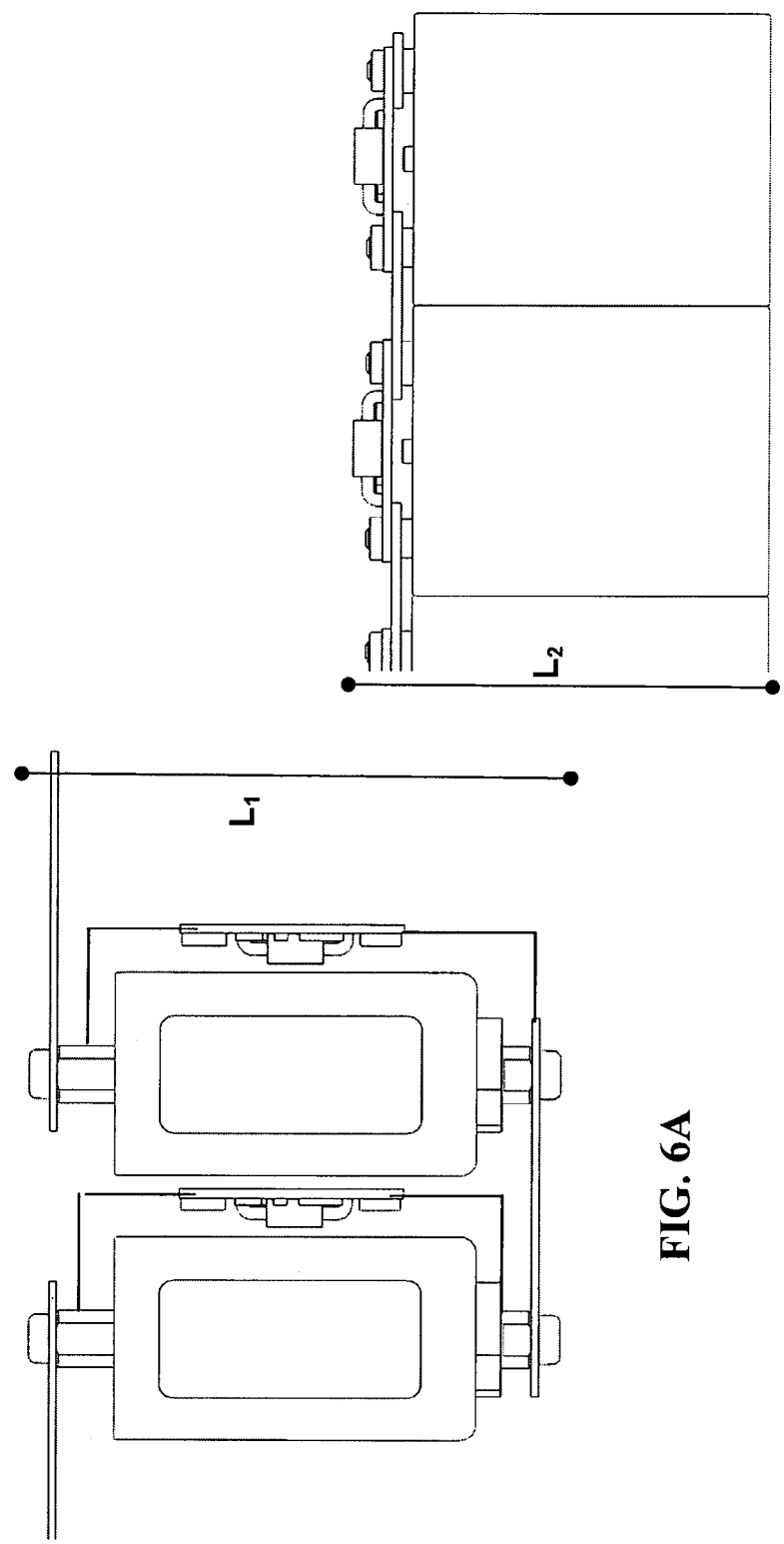
FIGS. 6A & 6B illustrate the comparative packing efficiency in the axial direction of: A) traditional cylindrical jelly-roll capacitor cells, and B) oblong modified jelly-roll capacitor cells, in accordance with various aspects of the present invention.

Moreover, the present invention provides an oblong packaged capacitor cell having two hardware terminals positions on a common surface, such as, for example, and end cap. Such a design allows for more efficient use of space than conventional designs by allowing electrical connections and/or optional balancing circuits to be positioned on one side of a capacitor cell. FIG. 6A illustrates a conventional capacitor design having electrical connections extending from opposite ends of the capacitor cell. In contrast, the oblong modified jelly-roll capacitor of the present invention can allow, in various aspects, all electrical connections to be made on a common side such as, for example, an end cap of the capacitor cell, as illustrated in FIG. 6B. One of the advantages possible in having electrical connections extend from a common end of a capacitor cell, as illustrated in FIG. 6B, is a reduction in the volume requirements for a capacitor cell, as compared to a conventional design, as illustrated in FIG. 6A. The lines $L_1$ and $L_2$ in FIGS. 6A and 6B, respectively, illustrate such a reduction in volume.

Thermal Management

Figure 7:
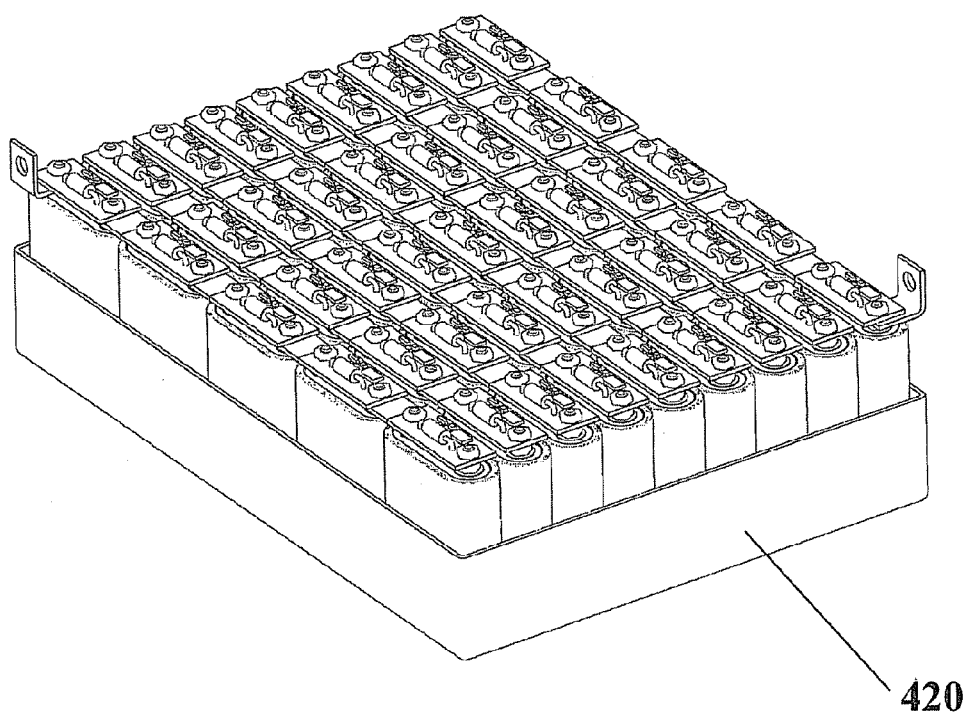
FIG. 7 is a three dimensional representation of a multiple cell capacitor assembly comprising 45 individual cells connected in series, in accordance with various aspects of the present invention.
Figure 8:
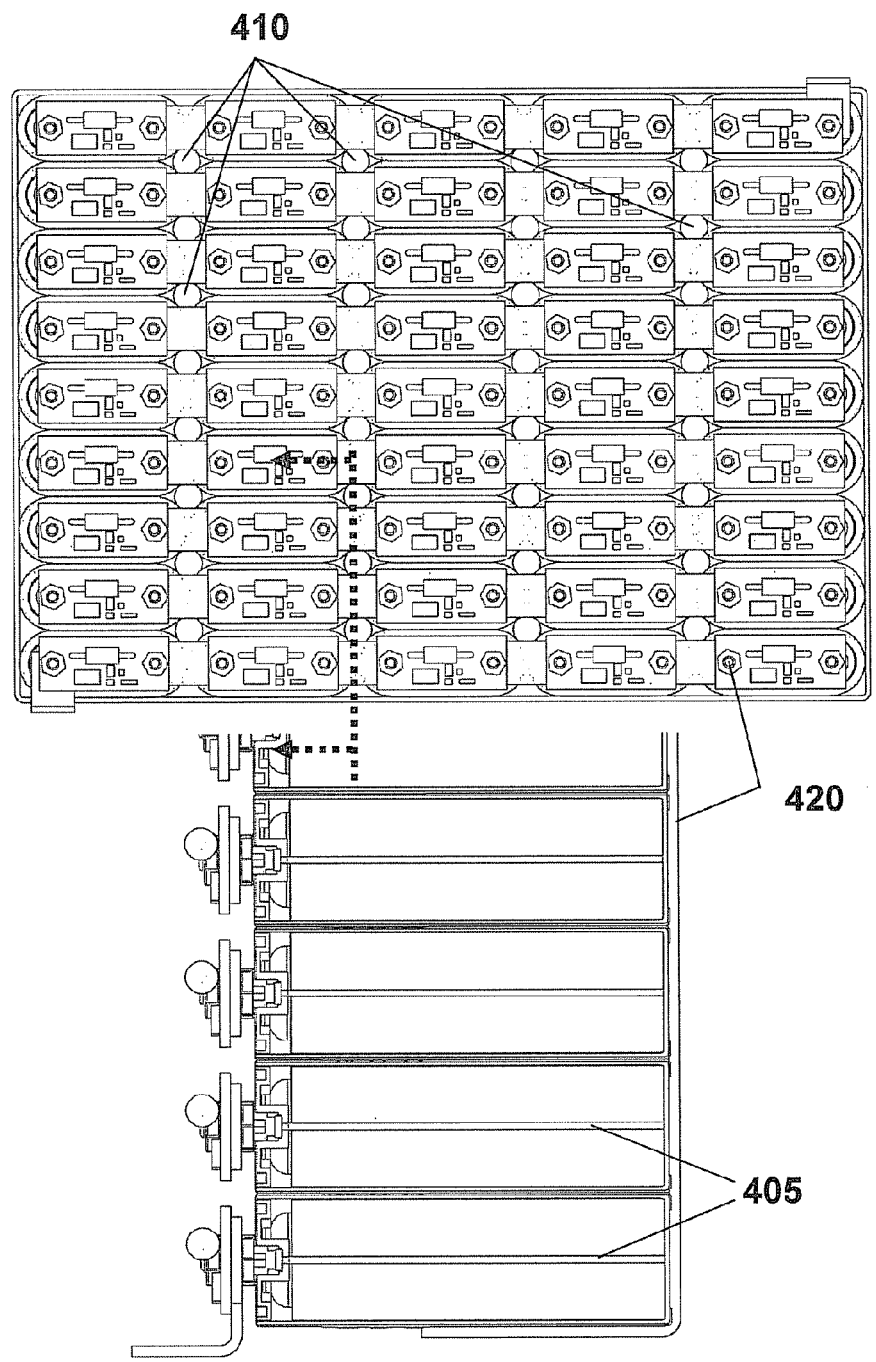
FIG. 8 is a two dimensional representation of the multiple cell capacitor assembly of FIG. 7, illustrating ventilation holes between individual cells, a possible location for mounting an optional heat sink, an optional thermal transfer pad, and an optional support tray, in accordance with various aspects of the present invention.

The oblong modified jelly-roll design of the present invention can also provide, in various aspects, an array of individual capacitor cells, wherein at least one surface of the array, such as, for example, a surface opposite to the hardware terminals of the plurality of individual capacitor cells comprising the array, is planar. In one aspect, a plurality of individual cells are positioned with hardware terminals facing the same direction, such that the opposite side of the array is flat. In another aspect, an array of individual capacitor cells having a flat surface are positioned in a tray 420 or other container that can act as a heat sink. FIGS. 7 and 8 illustrate an array of capacitor cells positioned in a tray. In FIG. 8, a top view and a cross-sectional view (section indicated by the dashed line) of a tray of capacitor cells are illustrated. A heat sink of common construction such as, for example, fins, can optionally be attached to the sides of a tray to provide cooling surface area to a multi-cell module. In other aspects, a thermally conductive transfer pad and/or thermal grease can be used to improve the thermal conductivity between the individual cells and the heat sink tray. Such a thermal pad can, in various aspects, be positioned between the flat bottom of one or more capacitor cells or containers comprising capacitor cells and a tray. If a mandrel 405, as described here, is used in construction of the modified jelly-roll of the capacitor, the mandrel can optionally be thermally connected to the heat sink tray 420, thermal transfer pad, or other means for efficiently conducting heat away from the capacitor cells.

The combination of high packing density, common side electrical connections, and improved thermal management can provide a device having high overall energy density. In one aspect, the energy per unit volume of the device is higher than in conventional capacitors and/or banks of multiple capacitors. In one aspect, each capacitor in such a device can have an energy density of at least about 6.5 Wh/l. In an exemplary aspect, an oblong cell electrochemical double layer capacitor can have a width of about 0.77 inches, a length of about 1.83 inches, and a height of about 3.5 inches, and achieve an energy density of about 6.5 Wh/l using commercially available carbon coated on foil electrodes.

Isolation of Individual Capacitor Cells

The modular design of the oblong multi-capacitor device of the present invention can, in various aspects, facilitate simplified electrical connections and isolation and/or replacement of any individual capacitor cell without affecting adjacent capacitor cells. In one aspect, a bus type interface can be used to electrically connect the individual capacitor cells in a series circuit. Arrangement of the individual cells in a fashion wherein all electrical connections are on a common surface can, in various aspects, facilitate simplified isolation, removal, and/or replacement of an individual capacitor cell. Similarly, a bus bar interface, as described here, can allow removal of one or more individual capacitor cells without disturbing adjacent capacitor cells. In one aspect, an individual cell can be isolated and removed while the remainder of the device is in operation.

In one aspect, the modular design of the device can provide the ability to electrically isolate any one or more of the capacitors within the device. Such isolation can be useful, for example, if an individual capacitor fails or does not perform adequately. The design of the device, in various aspects, can also allow each of the capacitors in the device to be independently addressable, such that a dysfunction in any one capacitor can be easily detected. The design can also, in various aspects, prevent the dysfunction of a capacitor from interfering and/or affecting the operation and/or performance of any other capacitor in the device.

While the articles, devices, and methods of the present invention are not intended to be limited to a particular application, they can be used, for example, to improve energy density and thermal management in high power demand applications, such as HEVs. Conventional capacitor materials and designs used in high power demand applications can require larger numbers of capacitors and/or a larger volume to provide similar power output. The present invention provides articles, devices, and methods to improve the energy density and thermal management of electrochemical double layer capacitors through an oblong modified jelly-roll design.

What is claimed is:

1. An electrochemical double-layer capacitor comprising
(a) a first electrode having a first longitudinal axis, a first body having a thickness, and a plurality of first fingers extending therefrom the first body in a first direction, which is substantially parallel to the first longitudinal axis;
(b) a second electrode having a second longitudinal axis, which is substantially parallel to the first longitudinal axis, a second body having a thickness, and a plurality of second fingers extending therefrom the second body in the first direction; and
(c) an electrolyte distributed between at least a portion of the first and second bodies;
wherein the first and second bodies are positioned in an interlaminated fashion and are separated by at least one non-conductive layer such that the first and second bodies are not in direct electrical contact,
wherein the interlaminated first and second bodies are substantially coiled about the first longitudinal axis,
wherein the first body and the first fingers of the first electrode are formed from a single first sheet of electrode material, and the second body and the second fingers of the second electrode are formed from a single second sheet of electrode material;

wherein at least a portion of the first or second fingers have a thickness greater than at least one of the first or second body thickness;

wherein the plurality of first fingers form a first tabbed portion that defines a first predetermined three dimensional pattern, and the plurality of second fingers form a second tabbed portion that defines a second predetermined three dimensional pattern, which is spaced therefrom the first tabbed portion, and wherein the first predetermined three dimensional pattern includes a plurality of straight fingers and a plurality of curved fingers that are curved around the first longitudinal axis, and the second predetermined three dimensional pattern includes a plurality of straight fingers and a plurality of curved fingers that are curved around the second longitudinal axis.

2. The electrochemical double-layer capacitor of claim 1, wherein at least a portion of the first or second fingers are folded.

3. The electrochemical double-layer capacitor of claim 1, wherein a capacitor cross section of the interlaminated first and second bodies in a plane that is substantially normal to the first longitudinal axis is substantially oblong.

4. The electrochemical double-layer capacitor of claim 3, further comprising a container having a longitudinal axis substantially parallel to the first longitudinal axis and having a container cross section substantially similar to the capacitor cross-section, and wherein the container encloses the interlaminated first and second bodies.

5. The electrochemical double-layer capacitor of claim 4, wherein the container comprises at least one port.

6. The electrochemical double-layer capacitor of claim 1, wherein at least one of the first and second tabbed portions are electrically connected to a first terminal.

7. The electrochemical double-layer capacitor of claim 1, wherein at least one of the first or second predetermined three dimensional pattern comprise a cavity, and wherein at least a portion of a terminal is substantially positioned in the cavity and is in electrical communication with the respective first or second tabbed portion.

8. The electrochemical double-layer capacitor of claim 1, wherein each of a portion of the plurality of first fingers are in electrical contact and/or each of a portion of the plurality of second fingers are in electrical contact.

9. The electrochemical double-layer capacitor of claim 1, further comprising a mandrel positioned parallel to the first longitudinal axis, and wherein the interlaminated first and second bodies are coiled about the mandrel.

10. The electrochemical double-layer capacitor of claim 9, wherein the mandrel is in thermal communication with a heat sink.

* * * * *